United States Patent [19]
Wei et al.

[11] 3,730,960
[45] May 1, 1973

[54] NOVEL FIRST AID PRODUCTS

[75] Inventors: Ling Wei Watchung; Robert Marchisotto, East Brunswick, both of N.J.

[73] Assignee: Plough Inc., Memphis, Tenn.

[22] Filed: June 25, 1971

[21] Appl. No.: 165,857

Related U.S. Application Data

[62] Division of Ser. No. 887,355, Dec. 22, 1969, Pat. No. 3,624,224.

[52] U.S. Cl. ................... 424/78, 252/106, 424/310, 424/329
[51] Int. Cl. ............................................. A61k 15/00
[58] Field of Search ...................... 252/106; 424/78; 424/310; 424/329

[56] References Cited

UNITED STATES PATENTS

| | | | |
|---|---|---|---|
| 3,539,520 | 11/1970 | Cantor et al. | 252/106 |
| 3,283,357 | 11/1966 | Decker et al. | 15/506 |
| 3,264,188 | 8/1966 | Gresham | 424/28 |
| 3,138,533 | 6/1964 | Heim | 424/25 |
| 2,999,265 | 9/1961 | Duane et al. | 15/506 |
| 2,921,885 | 1/1960 | Bouchal | 424/54 |
| 2,801,201 | 7/1957 | Kipnis | 424/310 X |
| 2,702,780 | 2/1955 | Lerner | 424/25 X |
| 2,689,814 | 9/1954 | Nicholls | 424/195 |
| 2,379,657 | 7/1945 | Ryberg | 206/632 |
| 1,353,954 | 9/1920 | Henry | 206/57 |

*Primary Examiner*—Shep K. Rose
*Attorney*—Bruce M. Eisen

[57] ABSTRACT

Disclosed herein are novel antiseptic compositions comprising an aqueous solution of a quaternary ammonium compound, a local anesthetic and a polyoxyethylene-polyoxypropylene block polymer. They are most advantageously supplied as impregnants of a hermetically sealed pad.

6 Claims, No Drawings

NOVEL FIRST AID PRODUCTS

This is a division of application Ser. No. 887,355 filed Dec. 22, 1969, now U.S. Pat. No.3,624,224 dated Nov. 30,1971.

This invention relates to novel compositions of matter and to an article incorporating these compositions which uniquely fully exploits all their beneficial properties.

These novel compositions can be used to treat minor skin wounds, abrasions, burns, and similar first aid problems. They fight infection, relieve pain on contact and generally sooth the injured area. Furthermore, this antiseptic action is effected without a stinging sensation, thus rendering these compositions especially valuable for treating children and pets who are often reluctant to receive commonly used first aid treatments because of their stinging effect. Moreover, shortly after application, these compositions air-dry and deposit an invisible film which prolongs the activity and aids in protecting the injured area from further immediate contamination. These novel compositions broadly comprise aqueous solutions of a germicidal quaternary ammonium compound, a local anesthetic, and a polyoxyethylene-polyoxypropylene block polymer.

Germicidal quaternary ammonium compounds are well known in the art. They are generally used in the form of their halides and preferably as chlorides. Preferred quaternary ammonium compound for use in the compositions of this invention are the alkylarylether dimethylbenzylammonium chlorides, an example of which is 2-[2-(p-octylcresoxy)ethoxy]ethyl dimethylbenzylammonium chloride, available under the name of methylbenzethonium chloride or Hyamine 10X and the corresponding p-octylphenoxy compound available as benzethonium chloride or Hyamine 1622; and the alkyldimethylbenzyl ammonium chlorides available under the name benzalkonium chloride. Other suitable germicidal quaternary ammonium compounds are alkyltrimethyl ammonium chloride, such as cetyltrimethylammonium chloride available under the trade name Cateb; alkyldimethylethylammonium halide such as alkenyldimethylethylammonium bromide known under the trade name Onyxide; alkylpyridinium chloride, such as cetylpyridinium chloride; alkylimidazolinium chloride such as alkylhydroxyethylimidazolinium chloride known as Alrosept MB; alkyldimethyldichlorobenzylammonium chloride such as alkyldimethyl-3,4-dichloro benzylammonium chloride known as Tetrosan; acylcolaminoformylmethyl pyridinium chloride available under the name of Emulsept; and alkarylmethylpyridinium chloride such as polyalkylnaphthalene methylpyridinium chloride available under the trade name Emcol. In the foregoing compounds the term "alkyl" is understood to encompass $C_8H_{17}$ to $C_{18}H_{37}$ radicals including mixtures within this range, this being the range in which quaternary ammonium compounds are considered to have good germicidal activity.

Similarly, local anesthetics are a well-known class of materials. The preferred sub-class of local anesthetics for use in a composition of this invention are those amino-substituted phenyl esters and amides distinguishable by having a generic name ending in the syllable "caine". This class of local anesthetic compounds will be referred to hereinafter as "caine-type". Exemplary of these are lidocaine, tetracaine, benzocaine, procaine, cocaine, mepivacaine and bupivacaine. These can be used as the free base or in a form of their pharmaceutically acceptable acid addition salts, particularly as the hydrochloride. Preferred local anesthetics for use in compositions of this invention are tetracaine and lidocaine. Other local anesthetics which are not of the "caine-type" can also be used, for example, benzyl alcohol.

The polyoxyethylene-polyoxypropylene block polymers to be used in the composition of this invention are also well known in the art and may be represented by the structural formula:

$$HO(C_2H_4O)_a(C_3H_6O)_b(C_2H_4O)_cH$$

wherein the $(C_3H_8O)_b$ represents the polyoxypropylene hydrophobic base component and the $HO(C_2H_4O)_a$ and $(C_2H_4O)_cH$ represent the polyoxyethylene hydrophilic constituents. The polyoxyethylene portion of the polymer may vary from as little as 10 percent to as high as 90 percent. The higher the polyoxyethylene percentage, the more water-soluble becomes the total molecule or polymer. The substantially water-soluble polymers in the molecular weight range of between about five and about eleven thousand are preferable. These materials are readily available under the trade name Pluronic polyols. A preferred material of this class for use in the compositions of this invention is available under the trade name of Pluronic F68 and has an average molecular weight of about 8350, although it may vary in range between about 6000 and 9000. In this material $a$ and $c$ in the above formula can, for example, each be 72 and $b$ can be 26.

Both the antimicrobial quaternary ammonium compounds and the local anesthetics should be present in the aqueous composition of this invention in a range of 0.1 to 2 percent by weight. The polyoxyethylene-polyoxypropylene block polymers should be present in the amount of 2 to 15 percent by weight of the total composition and preferably 3 to 7 percent. The bulk of the composition is of course water.

The aqueous compositions of this invention can optionally contain, in addition to the above ingredients, other materials to maximize effectiveness.

Nonionic polyethenoxy surface active agents such as the well-known polyethenoxy mono-ethers, polyethenoxy mono-esters and polyethenoxy mono-amides are advantageously included in the composition of this invention, preferably in an amount of 0.2 to 3 percent by weight of the composition. These nonionic surface active agents provide detergent action to a much greater extent than the free polyoxyethylene-polyoxypropylene block polymer polyols. Such compounds are well-known in the art. The preferred class of materials of this type for use in this invention are the polyethenoxy mono-ethers of alkylphenols as exemplified by polyethenoxy mono-isooctylphenylether, available under the trade name Triton X-100. Other suitable nonionic surface active agents are polyoxyethylenesorbitan mono-oleate, and the corresponding mono-stearate.

Desirably, the composition of this invention also included a humectant such as propylene glycol, glycerine, sorbitol, di-ethylene glycol or polyethylene glycol. In addition to their humectant effect, these materials also serve in aiding dissolution or emulsion of the composition of this invention. These materials are desirably employed within the range of about 1 to 10 percent.

A chelating agent such as ethylenediamine tetraacetic acid (EDTA) can optionally be added to enhance the antibacterial activity of these compositions.

A minor amount (e.g. 3 percent) of isopropanol can be added to impart a "medicinal odor". Similarly, a small amount (e.g. 0.5 percent) of menthol provides a soothing "cool feeling". Calming an injured child or other patient is a desirable part of first aid treatment.

Auxillary medicaments may be incorporated into the compositions of this invention to broaden the scope of treatment, as for example, the inclusion of a minor amount of chlorothymol to impart fungicidal properties.

The compositions of this invention can be applied to the injured area in numerous ways. They can be directly applied from a squeeze bottle or dropper, for example, or sprayed on employing an aerosol cannister containing a conventional propellant such as the Freons. Alternatively, a swab can be introduced into a container of the formulation and saturated therewith and applied to the injured area. Similarly, the solutions can be applied by means of a handkerchief or other extraneous cloth or tissue. Each of these methods has disadvantages, however, with regard to convenience, hygiene and/or effectiveness.

As a highly preferred embodiment of this invention, we have found that the maximum benefit of the compositions of this invention can be realized in the embodiment of a hermetically sealed packet containing a pad impregnated with these compositions. The pad should be an absorptive sheet preferably made of non-woven cellulosic material. Non-woven rayon has been found to be particularly good for this purpose. The packet should be impervious to liquid or vapor and its interior should be inert to the composition of this invention. Such packets are well-known in the art and preferably comprise an outer surface of a metal foil such as aluminum whose inner surface is lined with a thermoplastic film such as polyethylene, polyvinyl resin or cellulose acetate as described, for example, in U.S. Pat. No. 3,057,467. A laminate having an intermediate layer of paper is an advantageous variation. This sealed packet protects both the composition and the applicator against contamination occurring after manufacture and before application to the wounded area.

The invention in this preferred embodiment furthermore provides a sanitary means to cleanse the wounded area thoroughly of dirt and other particles. Thus, it aids in preventing further infection by removal of superficial organisms that have not yet infected the wound, and by prophylaxis of the surrounding area, while at the same time fighting infection by any organisms already in the wound. Use of this pad also permits the application of a thin uniform coating of the composition, thereby minimizing the time necessary for the skin to dry and the film to form. In this embodiment it is preferred that the compositions additionally contain a non-ionic polyethenoxy surface active agent as described above to further aid in the cleansing operation.

This preferred embodiment provides an ideal means to have the compositions of this invention readily available at the time the injury is sustained since it can be carried in the pocket, handbag, as well as stored on vehicles or at home or work. The entire packet is inexpensive enough to be disposed of after a single use. Moreover, the open foil packet provides a hygienic plane to temporarily store the used pad until suitable disposal facilities become available.

The following example illustrates a preferred embodiment of this invention.

EXAMPLE

A piece of non-woven rayon pad measuring 3 inches × 3 ½ inches is folded longitudinally and transversely and is inserted into a pouch formed by two sheets of a laminate of aluminum foil and paper, coated (on the paper side) with polyethylene. Two milliliters of a formulation consisting of:

| | |
|---|---|
| methylbenzethonium chloride | 0.5% |
| tetracaine hydrochloride | 0.6% |
| polyoxyethylene-polyoxypropylene (Pluronic F68) | 5.0% |
| polyethenoxy alkylaryl ether (Triton X100) | 2.0% |
| propylene glycol | 3.0% |
| isopropyl alcohol | 3.0% |
| menthol | 0.1% |
| purified water | 85.8% | are injected into the folds of the pad and the aluminum laminate is then heat sealed on the open fourth side to complete the packet.

The pad could alternatively be folded in a "zigzag" or "accordian-pleating" fold. Numerous other variations of the above-described non-stinging products and processes that within the spirit of this invention will become apparent to one skilled in the art.

What is claimed is:

1. A non-stinging antiseptic composition consisting essentially of an aqueous solution of effective amounts within the range of 0.1–2 percent by weight of each of a germicidal quaternary ammonium halide and a local anesthetic compound, and 2-15 percent by weight of a water soluble polyoxyethylene-polyoxypropylene block polymer and 0.2–3 percent by weight of a nonionic surface active agent selected from the class consisting of polyethenoxy ethers, polyethenoxy esters and polyethenoxy amides.

2. A composition according to claim 1 wherein said local anesthetic is of the "caine-type".

3. A composition according to claim 1 wherever said local anesthetic is selected from the group consisting of tetracaine and lidocaine.

4. A composition according to claim 1 wherein said additional surface active agent is a polyethenoxy monoalkylaryl ether.

5. A composition according to claim 1 wherein said block polymer has an average molecular weight between about 5000 and 11,000.

6. A composition according to claim 1 wherein said block polymer has an average molecular weight between about 6000 and 9000.

* * * * *